(12) United States Patent
Peng et al.

(10) Patent No.: US 10,476,269 B2
(45) Date of Patent: Nov. 12, 2019

(54) METHOD FOR INDEPENDENT REAL AND REACTIVE POWER FLOW CONTROL USING LOCALLY AVAILABLE PARAMETERS (71) Applicant: Board of Trustees of Michigan State University, East Lansing, MI (US)

(72) Inventors: Fang Z. Peng, Okemos, MI (US); Shuitao Yang, Lansing, MI (US); Deepak Gunasekaran, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 76 days.

(21) Appl. No.: 15/752,503

(22) PCT Filed: Aug. 4, 2016

(86) PCT No.: PCT/US2016/045615
§ 371 (c)(1),
(2) Date: Feb. 13, 2018

(87) PCT Pub. No.: WO2017/030804
PCT Pub. Date: Feb. 23, 2017

(65) Prior Publication Data
US 2018/0241212 A1   Aug. 23, 2018

Related U.S. Application Data

(60) Provisional application No. 62/205,152, filed on Aug. 14, 2015.

(51) Int. Cl.
*H02J 3/18* (2006.01)
*H02M 1/42* (2007.01)
*G05F 1/70* (2006.01)

(52) U.S. Cl.
CPC ......... *H02J 3/1807* (2013.01); *H02M 1/4208* (2013.01); *G05F 1/70* (2013.01)

(58) Field of Classification Search
CPC ... G05F 1/70; H02J 3/16; H02J 3/1807–1871; H02J 3/20; H02J 3/22;
(Continued)

(56) References Cited

U.S. PATENT DOCUMENTS 10,027,119 B2 *   7/2018   Wells .................. H02J 3/18
2005/0071050 A1   3/2005   Chow et al.
(Continued)

FOREIGN PATENT DOCUMENTS

KR   1020070105163 A   10/2007

OTHER PUBLICATIONS

English translation Abstract of KR 1020070105163(A); Downloaded from espacenet.com on Jan. 16, 2018; 13 pages.
(Continued)

*Primary Examiner* — Jeffrey A Gblende
*Assistant Examiner* — Peter M Novak
(74) *Attorney, Agent, or Firm* — Howard & Howard Attorneys PLLC (57) ABSTRACT

A method for independent real and reactive power flow control without sensing receiving end voltage in a power flow controller (PFC) includes calculating a first reference phase angle, calculating a first reference voltage, modifying the first reference phase angle calculated using a first phasor modifier, calculating a first reference current for a first terminal, calculating a second reference phase angle for current through the first terminal, calculating a second reference voltage across a second CMI by subtracting voltages at the first terminal and a second terminal, and controlling the first CMI and the second CMI for controlling the power flow through the PFC.

21 Claims, 3 Drawing Sheets

(58) Field of Classification Search
CPC .... H02J 1/42; H02M 5/257–275; H02M 1/42;
H02M 1/4216
USPC .................................................. 323/205, 207
See application file for complete search history.

(56) References Cited

U.S. PATENT DOCUMENTS

2014/0009980 A1   1/2014  Divan et al.
2014/0307494 A1* 10/2014  Wu ......................... H02M 7/48
                                                       363/97
2014/0319910 A1  10/2014  Divan et al.
2015/0029764 A1   1/2015  Peng
2017/0199502 A1*  7/2017  Tian ...................... H02J 3/1814
2018/0048151 A1*  2/2018  Patel ................... G06F 17/5036

OTHER PUBLICATIONS

International Search Report & Written Opinion of PCT/US2016/045615, dated Jan. 5, 2017; 11 pages.

* cited by examiner

METHOD FOR INDEPENDENT REAL AND REACTIVE POWER FLOW CONTROL USING LOCALLY AVAILABLE PARAMETERS

CROSS-REFERENCE TO RELATED APPLICATION(S)

This application is the National Stage of International Patent Application No. PCT/US2016/045615, filed on Aug. 4, 2016, which claims priority to and all the advantages of U.S. Provisional Patent Application No. 62/205,152, filed on Aug. 14, 2015, the entire contents of both are incorporated herein by reference.

STATEMENT REGARDING FEDERALLY SPONSORED RESEARCH OR DEVELOPMENT

This invention was made with government support under DE-AR0000222 awarded by the U.S. Department of Energy. The government has certain rights in the invention.

BACKGROUND OF THE INVENTION

1. Field of the Invention

The present invention relates generally to power control devices and, more particularly, to a method for independent real and reactive power flow control using locally available parameters in a power control device.

2. Description of the Related Art

High voltage electrical transmission and distribution may be performed with a variety of configurations, including a radial grid system and a mesh grid system. A meshed grid system may have various benefits over a radial grid system, including higher reliability, especially under contingency conditions. However, unless the meshed grid system is able to be controlled effectively, the network may be unable to handle congestion of key transmission lines when distributed, unscheduled, or intermittent alternative energy sources are connected to the grid.

It is known to provide power control devices between interconnected synchronous grids in order to reduce congestion, increase capacity of existing transmission lines and improve stability. An example of such a power control device is disclosed in PCT International Publication Number WO 2013/126660 to Peng. In that publication, the power control device includes cascade multilevel inverters (CMIs) that are configured and operated such that transformers may be eliminated entirely. By reducing or eliminating transformers, the power control devices may be cheaper, smaller, faster to respond (for example only, dynamic performance response of 1-2 milliseconds may be achieved), higher efficiency, lighter weight, and more reliable when compared to, for example only, to Unified Power Flow Controllers (UPFCs). This may allow power control devices to be more widely used in new and existing grid installations. For example, the power control device may be well suited for increasing the penetration of renewable energy, such as wind and solar, which may require properties such as high dynamic performance, light weight, small size, and low cost.

Power control devices may be used as energy routers and may be easily integrated over existing transmission lines to maximize power flow through a power line. As an example, a power control device could be used to provide a certain amount of power, such as 100 MW, from a bus onto a specified transmission line. Use of power control devices may enhance grid stability and allow more rapid and more reliable integration, development, and deployment of renewable power generation. For example only, power control devices can be used to regulate and control power flow over AC transmission lines. In a mesh AC network, power control devices can be used to prevent loop flows of power, which has the potential to cause a serious blackout due to overloading of transmission networks. Additionally, power control devices may be designed to have a minimal effect on power factor.

Power control devices between interconnected synchronous grids are required in order to reduce congestion, increase capacity of existing transmission lines and improve stability. In most cases, such an interconnection takes place through overhead transmission lines, underground AC cable either over land or water or a combination thereof. In such interconnected synchronous grids, the location of the power control device may often be decided by right of way issues and land geography or other such factors.

In one example, a substation on one peninsula houses two 200-MW HVDC converters used as power control devices. A 138-kV underwater AC double circuit cable connects the substation on the one peninsula to a substation across the water to another peninsula. In this example, the power control device is placed at one peninsula, but it is connected via the AC underground cables far away from a sending end located at the other peninsula (interconnection is underwater between the peninsulas).

In another example, three 100 MW (300 MW capacity) variable frequency transformer (VFT) are located between substation interconnections. The aim of the VFT is to function as a power control device between either substation by effectively routing power from one end to another The VFT is located at one substation and the interconnection is by way of a 345 kV oil filled underground cable (8,500 ft) to the other substation. In this example, the power flow control in the interconnect is performed using the VFT, but the VFT is located far away from a receiving end.

While these technologies can effectively function as power control devices, they have several disadvantages. The HVDC technology used in the first example described above suffers from low efficiency and high device power ratings. The VFT used in second example described above is not a purely power electronics option and uses electrical machines. The efficiency and size of this technology is a major concern. A major limitation with such state-of-the-art technologies described above is that the sending and/or receiving end is located far away from the other end. As such, there is a need in the art for an efficient and fractionally-rated power flow controller that can be located anywhere on an inter-connected synchronous grid is a major customer problem that needs to be solved.

The implementation of the control module in the above described patent may lead to long additional lines or other circuitry to detect parameters that are far away from the location of the power control device.

Additionally, claim 25 of the patent described above relies on determining a reference voltage based on commanded real and reactive power, and controlling the second CMI to create the reference voltage across the second CMI. But, accurate calculation of the voltage reference based on commanded real and reactive power would need information about the receiving end terminal and/or impedance between second terminal and the receiving end.

The transformer-less unified power flow controller disclosed in PCT International Publication Number WO 2013/126660 qualifies as a fractionally rated power control device based on publication Gunasekaran, D.; Shuitao Yang; Fang Zheng Peng, "Fractionally rated transformer-less unified power flow controllers for interconnecting synchronous AC grids," *Applied Power Electronics Conference and Exposition (APEC)*, 2015 *IEEE*, vol., no., pp. 1795, 1799, 15-19 Mar. 2015 doi: 10.1109/APEC.2015.7104590.

SUMMARY OF THE INVENTION

Accordingly, the present invention is a method for independent real and reactive power flow control without sensing end voltages in a power control device provided between a first terminal and a second terminal of a transmission line. The method includes the steps of connecting a first cascaded multilevel inverter (CMI) for the power control device between the second terminal and a reference potential and a second CMI for the power control device in series between the first terminal and the second terminal. The method also includes the steps of calculating a first reference phase angle based on a difference between a reference active power and a sensed active power being delivered from the second terminal to a receiving end and calculating a first reference voltage based on a difference between a reference reactive power and a sensed reactive power being delivered from the second terminal to the receiving end.

The method also includes the steps of modifying the first reference phase angle calculated using a first phasor modifier in order to provide for the power loss encountered due to operation of the first CMI and the second CMI, calculating a first reference current for the first terminal based on a difference between the reference active power and the sensed active power being delivered from the first terminal, calculating a second reference phase angle for current through the first terminal in order to ensure that an average active power and an average reactive power into and out of the first CMI and the second CMI is zero, calculating a second reference voltage across the second CMI by subtracting voltages at the first terminal and the second terminal, and controlling the first CMI using the calculated first reference voltage and controlling the second CMI using the calculated second reference voltage for controlling the power flow through the PFC. All the methods described above only use locally available parameters at the location of power control device.

One advantage of the present invention is that a new method for independent real and reactive power flow control is provided for a power control device. Another advantage of the present invention is that the method can control independent real and reactive power flow in a power line without sensing end voltage in an interconnected synchronous grid. Yet another advantage of the present invention is that the method leads to a control that only relies on locally available parameters for controlling power flow. Still another advantage of the present invention is that the method eliminates the need for knowing terminal impedances in order to control power flow in different configurations of a power flow control device such as a transformer-less UPFC. A further advantage of the present invention is that the method enables the power flow control device such as a transformer-less UPFC to provide power flow control between synchronous grids located far away from each other at a much lower cost compared to existing technologies. Yet a further advantage of the present invention is that the method allows the use of a power flow control device such as a transformer-less UPFC. Still a further advantage of the present invention is that the method allows the power flow control device such as a transformer-less UPFC to have a low power rating (in comparison to HVDC based interconnection) and high efficiency (compared to variable frequency transformers) when used for the same purpose of power flow control.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

A transformer-less unified power flow controller according to the prior art includes cascade multilevel inverters (CMIs) configured such that transformers may be eliminated entirely. They may be referred to more broadly as power control devices. These power control devices may be used as energy routers and may be easily integrated over existing transmission lines to maximize energy transmission. For example only, the power control devices can be used to regulate and control power flow over AC transmission lines or distribution lines. It should be appreciated that, in a mesh AC network, transformer-less UPFCs can be used to prevent loops of power, which decrease efficiency and can result in detrimental feedback loops. It should also be appreciated that power control devices may include or be configured other than as a transformer-less unified power flow controller.

Figure 1A:
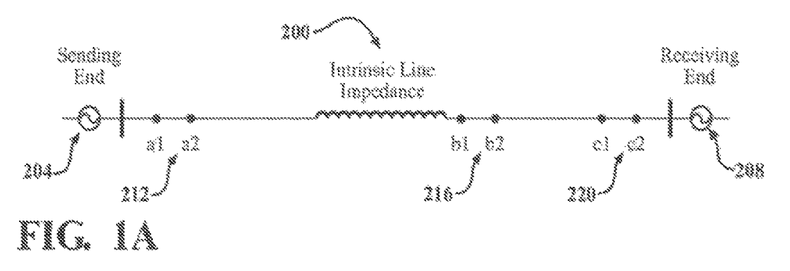
FIG. 1A is a schematic single-line diagram of a transmission line according to the principles of the prior art.

Referring to FIG. 1A, examples of UPFC placement along a power line are presented. As illustrated, a power line 200 is connected between a sending end 204 and a receiving end 208. The power line 200 has an intrinsic impedance, which is represented graphically as an inductor. Along the transmission line 200 are pairs of points a1/a2 212, b1/b2 216, and c1/c2 220. The transformer-less unified power flow controllers may be connected between terminals a1 and a2 212, between terminals b1 and b2 216, and/or between terminals d and c2 220.

Figure 1B:
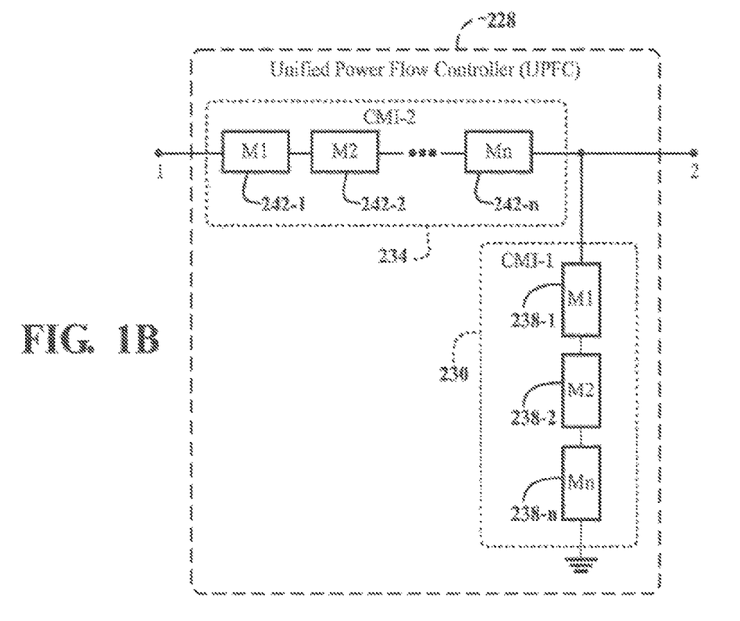
FIG. 1B is a schematic single-line diagram of an example of a unified power flow controller (UPFC) according to the principles of the prior art used with the transmission line of FIG. 1A.

Referring to FIG. 1B, an example implementation of a transformer-less unified power flow controller 228 is shown. As illustrated, first and second terminals of the UPFC 228 are labeled 1 and 2, respectively. For example, the UPFC 228 of FIG. 1B may be connected between points a1 and a2 212 of FIG. 1A, where a1 corresponds to terminal 1 of FIG. 1B and a2 corresponds to terminal 2 of FIG. 1B. In various implementations, the UPFC 228 may be reversible, such that a1 will correspond to terminal 2 of FIG. 1B, while a2 corresponds to terminal 1 of FIG. 1B. The UPFC 228 of FIG. 1B may be bidirectional such that either configuration can be used. The UPFC 228 is formed by a first cascaded multilevel inverter (CMI) 230 connected between terminal 2 and a reference potential, such as ground, and a second CMI 234 connected in series between terminal 1 and terminal 2. Each of the CMIs 230 and 234 can be formed using a series of bridge modules. For example only, the first CMI 230 can be formed from a series chain of bridge modules M1 238-1, M2 238-2, . . . Mn 238-$n$ (collectively, bridge modules 238). Similarly, the second CMI 234 may be formed from M bridge modules M1 242-1, M2 242-2, . . . Mn 242-$n$ (collectively, bridge modules 242).

The bridge modules 242 used in the second CMI 234 may be different than some or all of the bridge modules 238 used in the first CMI 230. In addition, the number of bridge modules 242 in the second CMI 234 may be different than the number of bridge modules 238 in the first CMI 230. It should be appreciated that the bridge modules for a single CMI may all be of one type or may be of different types. It should also be appreciated that the first CMI 230, second CMI 234, and bridge modules 238 and 242 are similar to those disclosed in PCT International Publication No. WO 2013/12660, the disclosure of which in its entirety is hereby incorporated by reference.

Figure 2:
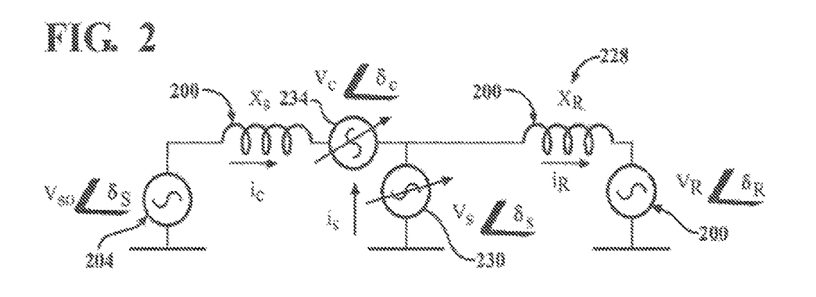
FIG. 2 is a schematic of a single phase equivalent circuit of the transformer-less UPFC of FIG. 1B.

Referring to FIG. 2, single phase equivalent circuit of the transformer-less UPFC 228 of FIG. 1B is shown. The equivalent circuit has been obtained by considering the CMIs 230 and 234 as equivalent variable AC voltage sources. The resistance of transmission lines has been neglected in the entire analysis. The glossary used in FIG. 2 is as follows:

$V_{Sa}$ represents the original sending end voltage;
$V_s$ represents the magnitude of shunt inverter voltage. This is also the effective sending end voltage;
$V_c$ represents the magnitude of series inverter voltage;
$V_R$ represents the magnitude of receiving end voltage;
$\delta_s$, $\delta_o$, $\delta_S$ and $\delta_R$ represent the phase angles of their respective voltages;
$X_S$ and $X_R$ represent the lumped sending end and receiving end impedance, respectively;
$i_C$ represents the instantaneous current through series inverter or second CMI 234; and
$i_S$ represents the instantaneous current through shunt inverter or first CMI 230 and $i_R$ represents instantaneous receiving end current.

Let P* and Q* be the required real and reactive power to be dispatched from the modified sending end ($V_s$). The aim of the control is to vary voltage magnitudes $V_C$, $V_S$ and angles $\delta_C$, $\delta_S$ in order to control P* and Q*. This subject to the following constraints:

voltage sources represented as phasors, $\vec{V}_s$ and $\vec{V}_c$ can only supply or absorb reactive power;
control must not involve sensing of: receiving end voltage as it may be far away from the point of installation; and
the controller must be immune against variation of line impedances and sending and receiving end voltages.

It should be appreciated that the circuit of FIG. is similar to that disclosed in the published article by Gunasekaran, D.; Shao Zhang; Shuitao Yang; Fang Zheng Peng, "Independent real and reactive power flow control without sensing receiving end voltage in transformer-less unified power flow controller," Energy Conversion Congress and Exposition (ECCE), 2014 IEEE, vol. 978-1-4799-5776-7, no. 14, pp. 730-735, September 2014, the disclosure of which is in its entirety hereby incorporated by reference.

Figure 3:
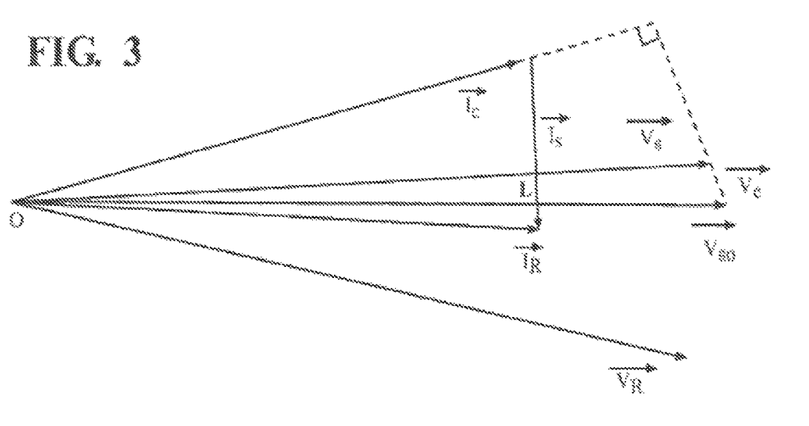
FIG. 3 is a diagrammatic view of a phase diagram representing the functioning of the single phase equivalent circuit of FIG. 2.

Referring to FIG. 3, a phasor diagram representing the functioning and a valid operating point is shown for the transformer-less UPFC 228 of FIG. 1B or the single phase equivalent circuit of FIG. 2. The voltage drop across is neglected in the phasor diagram.

Figure 4A:
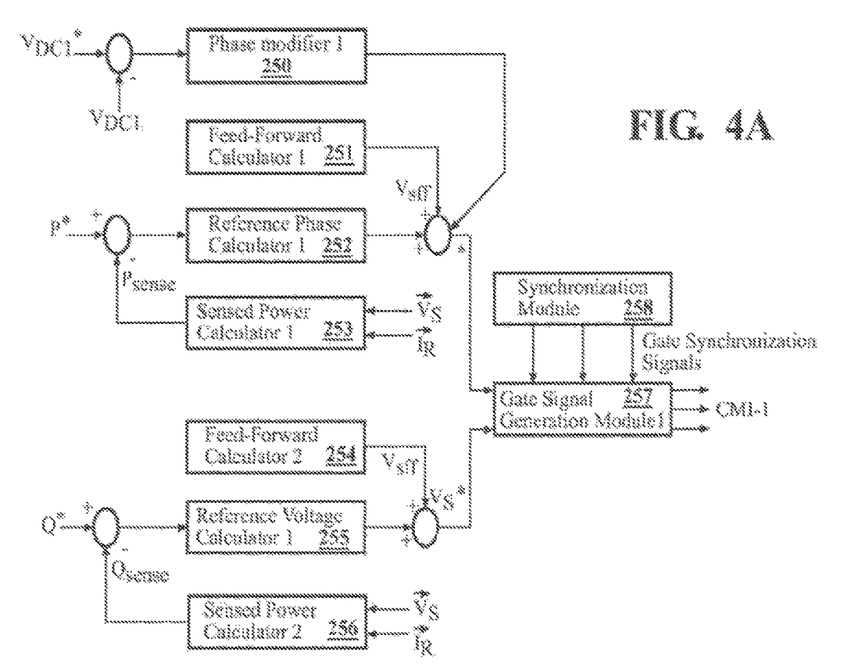
FIG. 4A is a diagrammatic view of an overall block diagram of a control module to control CMI-1, showing all the relevant blocks used in the transformer-less UPFC of FIG. 1B.
Figure 4B:
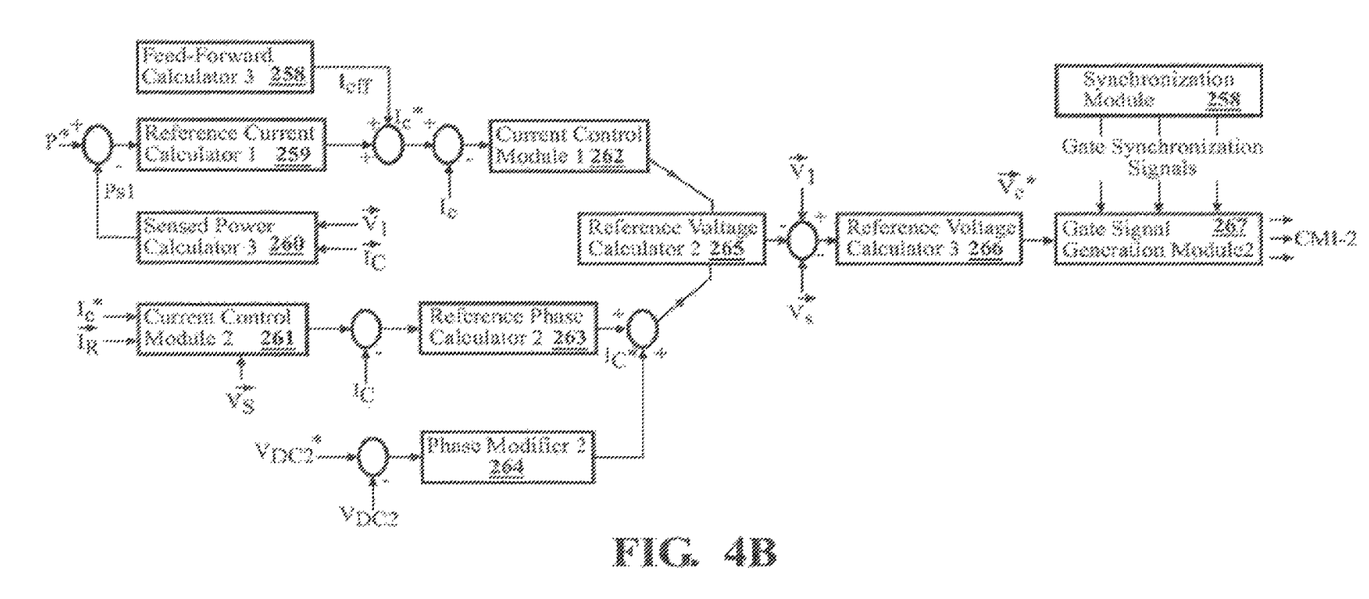
FIG. 4B is a diagrammatic view of an overall block diagram for providing gating signals CMI-2.

FIG. 4A illustrates the overall block diagram that controls the first CMI (CMI-1) 230. FIG. 4B illustrates the overall block diagram that provides gating signals to the second CMI (CMI-2) 234. Referring to FIG. 4A, based on the above discussion, the desired ideal control block diagram is shown. The reference active power, P* is compared against the sensed active Power, $P_{sense}$ which is determined using block 252. Block 253 senses the active power flowing out of terminal 2. The difference between the reference active power and the sensed active power is the input to block 252 which calculates one of the components of reference phase angle. The sum of outputs from blocks 250 through 252 provide the reference phase angle, $\delta_{Vs}^*$ for CMI-1. The reference reactive power, Q* is compared against the sensed reactive power, $Q_{sense}$ which is calculated using block 256. The output of the difference between Q* and $Q_{sense}$ serves as input to block 255 that generates one component of the voltage magnitude reference, $V_s^*$. The feed-forward component of the reference voltage magnitude's $V_{sff}$ is generated using block 254. The reference phase $\delta_{Vs}^*$ and reference voltage magnitude, $V_s^*$ are then sent to block 258 which generates the gate pulses for CMI-1. The grid synchronization signals are sent from the synchronization module 258.

FIG. 4B illustrates the overall control block diagram that leads to the gate pulses being provided for CMI-2. The reference active power P* is the same as the reference active power being dispatched from terminal 2. This is compared against the sensed active power, $P_{s1}$. The difference between P* and $P_{s1}$ is fed to block 259 which calculates one component of the reference current magnitude, $I_c^*$. The feed-forward component of $I_c^*$ is calculated using block 258. The reference current magnitude, $I_c^*$ is compared against the sensed current $I_c$ and the difference between the two parameters is sent as one of the inputs to block 265. Block 261 receives reference current magnitude $I_c^*$, sensed current phasor, $\vec{I}_R$ and sensed voltage phasor, $\vec{V}_S$ as inputs in order to determine its output. Block 263 takes the difference between that output and the sensed current phase, $\delta I_c$ as the input and determines the reference current phase $\delta I_c^*$. This reference is then modified by means of block 264 in order to account for power loss encountered during the operation of CMI-2.

The reference current magnitude and reference phase are provided as inputs to block 265 that generates an input to block 266. The output of block 266 provides reference voltage phasor, $\vec{V}_c^*$ to the gate signal generation module 267. This block provides the gate pulses to CMI-2 using the signals from the grid synchronization module 258.

Reference Phase Calculator 1 (252)

The reference phase calculator 1, block 252 calculates the reference phase for the voltage phasor to be generated by CMI-1. The reference power to be dispatched from terminal 2 is given as P*. The sensed active power flowing out or into terminal 2 to or from the power line is termed as $P_{sense}$. From the basic power system equations, an expression linking phase angle and power flow can easily be derived. An example implementation of the block 252 is using a Proportional plus integral controller. The other example implementations may consist of proportional plus resonant controllers or any other implementation as demanded by the required dynamic response.

Sensed Power Calculator 1 (253)

The voltage phasor at terminal 2, $\vec{V}_S$ is sensed along with the current phasor through the power line, $\vec{I}_R$. In one example implementation, the polar expression, $P_{sense} = \text{Re}(\vec{V}_S, \vec{I}_R^*)$ can be solved in order to determine the sensed active power flowing into or out of terminal 2, where $\vec{I}_R^*$ represents the conjugate of current phasor, $\vec{I}_R$.

Feed-Forward Calculator 1 (251)

The aim of block 251 is to provide a pre-calculated steady state phase angle $\delta V_{sff}$ based on nominal values for receiving end and sending end voltages and impedances. This block may or may not be a part of the overall system. It should be appreciated that the overall block diagram can also be designed to function without the need for feed-forward block 251 without changing the rest of the blocks.

Phase Modifier 1 (250)

The role of block 250 is to provide a corrective term to the phase reference generated by blocks 251 and 252. An example implementation involves sensing the average DC voltage of all the CMI modules of CMI-1, $V_{DC1}$ and comparing it with a nominal reference, $V_{DC1}^*$. The output of block 250 provides the correction term to the phase angle reference, $\delta_{Vs}^*$. This is to account for the real power loss encountered due to operation of the CMI. It should be appreciated that these are typically the conduction and switching losses of the device, but, it can be designed to involve other losses in the system.

Reference Voltage Calculator 1 (255)

The reference voltage calculator 1, block 255 calculates the reference voltage magnitude for the voltage phasor to be generated by CMI-1. The reference reactive power to be dispatched from terminal 2 is given as $Q^*$. The sensed reactive power flowing out of terminal 2 onto the power line is termed as $Q_{sense}$. From the basic power system equations, a relation between $Q_{sense}$ and voltage magnitude can easily be derived. The aim of block 255 is to provide an output that drives the input to zero. At steady state, $Q_{sense}$ must equal $Q^*$. An example implementation of the block 252 is using a Proportional plus integral controller. The usage of this block is optional if tight reactive power control is not necessary. This may be the case in an example of the power control device interconnecting two strong synchronous grids.

The voltage phasor at terminal 2, $\vec{V}_S$ is sensed along with the current phasor through the power line, $\vec{I}_R$. In one example implementation, the polar expression, $Q_{sense} = \text{Im}(\vec{V}_S^* \vec{I}_R^*)$ can be solved in order to determine the reactive power flowing out or into terminal 2 from the power line. Where $\vec{I}_R^*$ represents the conjugate of the phasor, $\vec{I}_R$.

Feed-Forward Calculator 2 (254)

The aim of block 254 is to provide a pre-calculated steady state voltage magnitude reference, $V_{sff}$ based on nominal values for receiving end and sending end voltages and impedances. In an example implementation, block 254 can be designed by using the DQ transformation equations based on nominal values for the impedance and end voltages in the system.

For reference only, the equations containing feed-forward terms for $\vec{V}_S$ in D-Q domain, $V_{sd}$, $V_{sq}$ are described below:

$$Q^* \omega L_R - \left\{ \frac{P^* \omega L_R}{V_{Rd}} \right\}^2 + \frac{P^* \omega L_R V_{Rq}}{V_{Rd}} -$$

$$V_{sd}^2 \left\{ 1 + \frac{V_{Rq}^2}{V_{Rd}^2} \right\} - V_{sd} \left\{ \frac{2 P^* \omega L_R V_{Rq}}{V_{Rd}^2} - \frac{V_{Rq}^2}{V_{Rd}^2} - V_{Rd} \right\} = 0$$

$$V_{Sq} = \frac{P^* \omega L_R + V_{Sd} V_{Rq}}{V_{Rd}}$$

For example only, the feed-forward values may be stored for different cases of reference active and reactive power by means of a lookup table in a digital signal processor within the control module.

Gate Signal Generation Module 1 (257)

Block 257 receives the reference voltage magnitude, $V_S^*$ and the reference phase, $\delta_{Vs}^*$ as inputs. The grid synchronization signals are also provided as input. In an example implementation, block 257 may use a method such as Fundamental frequency modulation, Pulse width modulation or other such methods to convert the reference values into gate pulses.

Synchronization Module (258)

Block 258 provides input to the Gate signal generation modules 1 and 2. This input provides the information needed to synchronize the individual gate signals with a reference signal. This reference signal may be any accessible voltage on the power line that is not generated by the power control device. In an example implementation of this block, a phase locked loop may be tied to the voltage at terminal 1, given by $\vec{V}_1$.

Reference Current Calculator 1 (259)

The reference active power to be dispatched from second terminal of the power control device also serves as the reference active power for active power flowing from the first terminal 1. This is in accordance with the fact that CMI-1 and CMI-2 individually do not consume or deliver any active power. The input to block 259 is the difference between the reference active power, $P^x$ and the sensed active power flowing through terminal 1, $P_{s1}$. An example implementation of block 259 would include proportional and integral controllers or other commonly existing methods such as proportional and resonant controllers that force the input to close to zero. It should be appreciated that, at steady state, once the reference current is established, the power being drawn or delivered to the sending end is constant.

Sensed Power Calculator 3 (260)

Block 260 computes the Active power being drawn from terminal 1. $P_{s1}$ represents the calculated active power. In an example implementation, $P_{s1}$ may be calculated by solving for the expression below:

$$P_{s1} = \text{Re}(\vec{V}'_1, \vec{I}_c^+)$$

where, $\vec{V}_1$ represents the voltage phasor at terminal 1 and $\vec{I}_c^+$ represents the polar conjugate of the current phasor, $I_c$.

Current Control Module 2 (261)

The input to block 261 is the reference current magnitude through terminal 1, $I_c^*$, current phasor through the power line, $\vec{I'}_R$ and Voltage phasor at terminal 2, $\vec{V}_S$. Based on these inputs, block 260 determines the required phase angle of the current through terminal 1. The output from block 261 contributes to the eventual reference current phase angle that ensures that current phasor through CMI-1, $\vec{I}_s$ is orthogonal to the voltage phasor, $\vec{V}_s$. The steps involved in an example implementation are described below. Based on the information from $\vec{I}_R$ and $\vec{V}_s$, the direction of $\vec{I}_s$ can be predicted using the following constraints:

$$\vec{I}_R = \vec{I}_C + \vec{I}_s \text{ and } \vec{V}_s \cdot \vec{I}_s = 0;$$

Magnitude of current through terminal 1, $I_c$ is being controlled by blocks 258, 259 and 262. Using sensed current, $I_c$, the phase of current through terminal 1 represented by $\delta I_c$ is solved using the above constraints. For example only, these equations can be solved on a real time basis using a digital signal processor located in the control module.

Feed-Forward Calculator 3 (258)

Block 258 generates the steady current magnitude, $I_{cf}$ that is added to the output generated by block 259 in order to generate the reference current magnitude $I_c^*$. For an example implementation, block 258 may consist of lookup tables for different nominal voltages and reference power levels.

Reference Phase Calculator 2 (263)

The input to block 263 is the difference between the output generated by block 261 and the measured phase of the current through terminal 1, $\delta I_c$. The role of block 263 is to reduce the error in input to close to zero. For an example implementation, block 263 may consist of Proportional and integral controllers or other forms of controllers such as proportional and resonant controllers.

Phase Modifier 2 (264)

Block 264 modifies the phase reference generated by block 263. $V_{DC2}$ is an input that conveys information about some aspect of the DC link voltages of the M cascaded modules of CMI-2. $V_{DC2}^*$ provides a reference for the same. The output of block 264 generates a small change in the reference phase in order to account for the loss encountered in the devices due to the operation of the multiple modules in CMI-2. For an example implementation, the average DC voltage across all 'M' modules of one phase of CMI-2 is used as the feedback. The nominal DC link voltage serves as the reference.

Reference Voltage Calculator 2 (265)

Block 265 receives the reference current magnitude and reference current phase information from blocks 262 and 263 respectively. The reference current calculator 2 provides an output signal that when vectorally added to phasors, $\vec{V}_1$ and $\vec{V}_S$ provides the input to block 266. Thus, block 265 converts the current reference information to an equivalent voltage output. The output of block 265 compensates for any change in impedance of the sending end, any change in the sending end voltage and/or provide fast dynamic response to the overall system. An example implementation for block 265 may consist of a virtual impedance function that converts the current input to a voltage output. It may also involve frame transformation equations or co-ordinate transformation equations in order to provide a phasor voltage output.

Reference Voltage Calculator 3 (266)

Block 266 generates the reference voltage phasor for CMI-2. This block calculates the reference voltage phasor that needs to be developed across CMI-2. This is provided as a reference, $\vec{V}_c^*$ block 267. In an example implementation, block 266 may contain a variable gain, frame transformation equations and co-ordinate transformation equations to provide the output in a form understandable by the gate signal generation module 2.

Gate Signal Generation Module 2

This block receives the reference voltage phasor for CMI-2, $\vec{V}_c^*$. The grid synchronization signals are also provided as input. The output provides the gate pulses that drive the individual semiconductor devices in the CMI modules of CMI-2.

In an example implementation, this block may use a method such as Fundamental frequency modulation, Pulse width modulation or other such methods to convert the reference values into gate pulses.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A method for independent real and reactive power flow control without sensing voltages in a power flow controller (PFC) provided between a first terminal and a second terminal of a transmission line, said method comprising the steps of:
   connecting a first cascaded multilevel inverter (CMI) for the PFC between the second terminal and a reference potential and a second CMI for the PFC in series between the first terminal and the second terminal;
   calculating a first reference phase angle based on a difference between a reference active power and a sensed active power being delivered from the second terminal to a receiving end;
   calculating a first reference voltage based on a difference between a reference reactive power and a sensed reactive power being delivered from the second terminal to the receiving end;
   modifying the first reference phase angle calculated using a first phasor modifier in order to provide for a power loss encountered due to operation of the first CMI and the second CMI;
   calculating a first reference current for the first terminal based on a difference between the reference active power and the sensed active power being delivered from the first terminal;
   calculating a second reference phase angle for current through the first terminal in order to ensure that an average active power and an average reactive power into and out of the first CMI and the second CMI is zero;
   calculating a second reference voltage across the second CMI by subtracting voltages at the first terminal and the second terminal; and
   controlling the first CMI using the calculated first reference voltage and controlling the second CMI using the calculated second reference voltage for controlling the power flow through the PFC.

2. The method as set forth in claim 1 including the step of providing a first reference phase angle calculator and calculating the first reference phase angle with the first reference phase angle calculator.

3. The method as set forth in claim 2 including the step of providing a second reference phase angle calculator and calculating the second reference phase angle with the second reference phase angle calculator.

4. The method as set forth in claim 1 including the step of providing a first sensed power calculator and calculating a first sensed power with the first sensed power calculator.

5. The method as set forth in claim 4 including the step of providing a second sensed power calculator and calculating a second sensed power with the second sensed power calculator.

6. The method as set forth in claim 1 including the step of providing a first reference voltage calculator and calculating a first reference voltage with the first reference voltage calculator.

7. The method as set forth in claim 6 including the step of providing a second reference voltage calculator and calculating a second reference voltage with the second reference voltage calculator.

8. The method as set forth in claim 1 including the steps of providing a first feed forward calculator and calculating a first steady state voltage reference with the first feed forward calculator.

9. The method as set forth in claim 8 including the steps of providing a second feed forward calculator and calculating a second steady state voltage reference with the second feed forward calculator.

10. The method as set forth in claim 1 including the steps of providing a synchronization module and synchronizing individual gate signals with a reference signal with the synchronization module.

11. The method as set forth in claim 10 including the steps of providing a gate signal generation module and generating gate pulses from the gate signals with the gate signal generation module.

12. The method as set forth in claim 1 wherein the PFC is a unified transformer-less power flow controller.

13. A method for independent real and reactive power flow control without sensing voltages in a unified transformer-less power flow controller (PFC) provided between a first terminal and a second terminal of a transmission line, said method comprising the steps of:
  connecting a first cascaded multilevel inverter (CMI) for the PFC between the second terminal and a reference potential and a second CMI for the PFC in series between the first terminal and the second terminal;
  calculating a first reference phase angle based on a difference between a reference active power and a sensed active power being delivered from the second terminal to a receiving end;
  calculating a first reference voltage based on a difference between a reference reactive power and a sensed reactive power being delivered from the second terminal to the receiving end;
  modifying the first reference phase angle calculated using a first phasor modifier in order to provide for a power loss encountered due to operation of the first CMI and the second CMI;
  calculating a first reference current for the first terminal based on a difference between the reference active power and the sensed active power being delivered from the first terminal;
  calculating a second reference phase angle for current through the first terminal in order to ensure that an average active power and an average reactive power into and out of the first CMI and the second CMI is zero;
  calculating a second reference voltage across the second CMI by subtracting voltages at the first terminal and the second terminal;
  providing a gate signal generation module and generating gate pulses from gate signals with the gate signal generation module;
  providing a synchronization module and synchronizing individual gate signals with a reference signal with the synchronization module; and
  controlling the first CMI using the calculated first reference voltage and controlling the second CMI using the calculated second reference voltage for controlling the power flow through the PFC.

14. The method as set forth in claim 13 including the step of providing a first reference phase angle calculator and calculating the first reference phase angle with the first reference phase angle calculator.

15. The method as set forth in claim 14 including the step of providing a second reference phase angle calculator and calculating the second reference phase angle with the second reference phase angle calculator.

16. The method as set forth in claim 13 including the step of providing a first sensed power calculator and calculating a first sensed power with the first sensed power calculator.

17. The method as set forth in claim 16 including the step of providing a second sensed power calculator and calculating a second sensed power with the second sensed power calculator.

18. The method as set forth in claim 13 including the step of providing a first reference voltage calculator and calculating the first reference voltage with the first reference voltage calculator.

19. The method as set forth in claim 18 including the step of providing a second reference voltage calculator and calculating the second reference voltage with the second reference voltage calculator.

20. The method as set forth in claim 13 including the steps of providing a first feed forward calculator and calculating a first steady state voltage reference with the first feed forward calculator.

21. The method as set forth in claim 20 including the steps of providing a second feed forward calculator and calculating a second steady state voltage reference with the second feed forward calculator.

* * * * *